United States Patent [19]

Takeuchi et al.

[11] 4,362,626

[45] Dec. 7, 1982

[54] ION EXCHANGER OF HYDRATED OXIDE OF TI, ZR, OR SN AND CURED POLYESTER, AND EXCHANGE METHOD

[75] Inventors: Tatsuro Takeuchi, Oumihachiman; Masaki Sokukawa, Takatsuki; Ryuzo Kimoto, Ibaraki, all of Japan

[73] Assignee: Takeda Chemical Industries, Ltd., Japan

[21] Appl. No.: 177,508

[22] Filed: Aug. 12, 1980

[30] Foreign Application Priority Data

Aug. 16, 1979 [JP] Japan ............................. 54-104710
May 30, 1980 [JP] Japan ............................. 55-72947

[51] Int. Cl.³ .................... B01J 39/18; C08J 5/24; C08K 3/22
[52] U.S. Cl. .................... 210/670; 210/679; 210/683; 252/430; 521/123; 523/420; 523/442; 523/458; 523/459; 523/505; 523/515; 523/516; 524/783; 524/784; 524/847
[58] Field of Search ............... 260/37 EP; 523/505, 523/310, 515, 516; 252/430; 210/670, 679, 683

[56] References Cited

U.S. PATENT DOCUMENTS

| 2,768,264 | 10/1956 | Jones et al. ............. | 260/37 EP |
| 4,009,141 | 2/1977 | Nichols et al. ............ | 260/37 EP |
| 4,066,394 | 1/1978 | Leonard .................... | 210/679 |
| 4,171,283 | 10/1979 | Nakashima et al. ........ | 210/679 |
| 4,220,553 | 9/1980 | Krause ...................... | 252/430 |

FOREIGN PATENT DOCUMENTS 52-74588  6/1977  Japan
54-8185  1/1979  Japan

OTHER PUBLICATIONS

Kobayashi et al., "Adsorption—Bytitanium—", Nippon Kagaku Zasshi, 1979, (1) pp. 39-44.

*Primary Examiner*—John C. Bleutge
*Assistant Examiner*—A. H. Koeckert
*Attorney, Agent, or Firm*—Wenderoth, Lind & Ponack

[57] ABSTRACT

An adsorbent, which is prepared by subjecting to curing a mixture consisting of (a) one part by weight of at least one member selected from the group consisting of titanium oxide hydrate, zirconium oxide hydrate and tin oxide hydrate and of (b) about 1/10 to 3 parts by weight of an epoxy, unsaturated polyester or polyurethane resin.

The adsorbent can be used as an adsorbent for a great variety of anions and cations and especially as the adsorbent for phosphate ion.

The adsorbent displays also improved chemical resistance, resistant to acids and alkalis, and can be subjected to repeated desorption and regeneration procedures without causing any deterioration of its adsorptive capacity, thus permitting the repeated usage over a long period of time.

10 Claims, 1 Drawing Figure

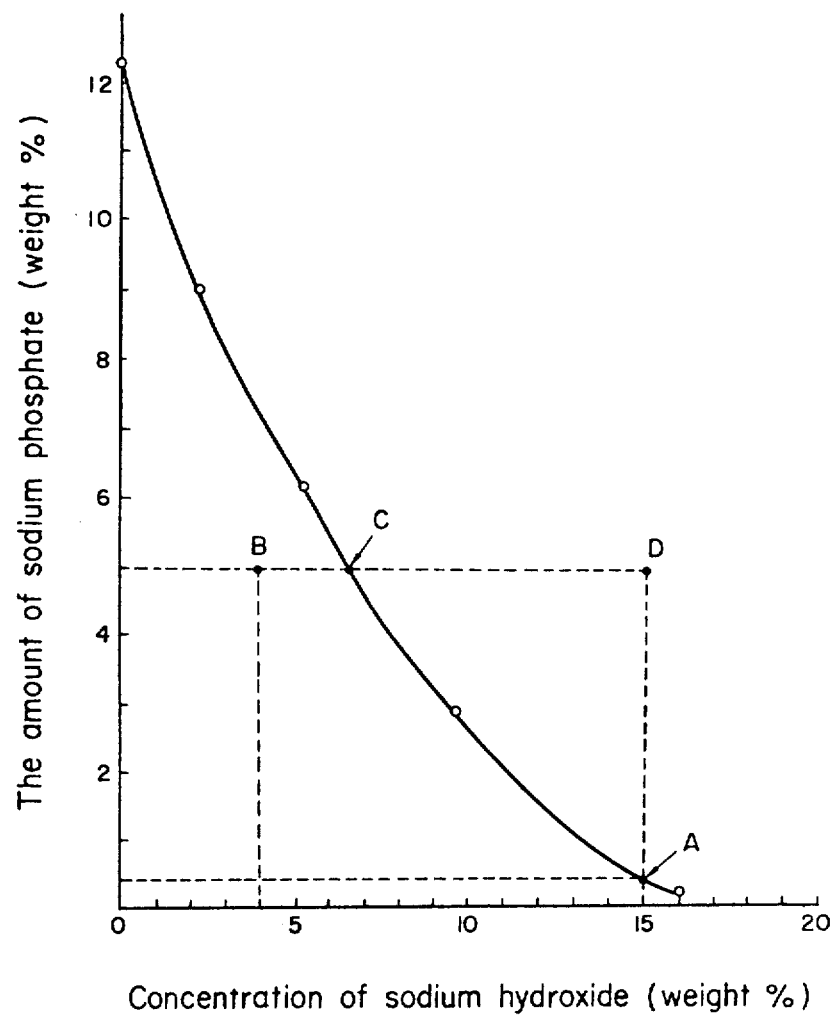

ION EXCHANGER OF HYDRATED OXIDE OF TI, ZR, OR SN AND CURED POLYESTER, AND EXCHANGE METHOD

This invention relates to an adsorbent based on a hydrate of titanium oxide, zirconium oxide or tin oxide or their mixture.

Recently, eutrophication in confined bodies of water such as the Inland Sea of Japan and the Lake Biwa is steadily increasing in its extent, resulting in bringing about a major social problem. Especially, removal of phosphate ions, causing, among others, such eutrophication, has become an important problem that is required to be solved with great urgency.

The so-called flocculation sedimentation method, which is considered the sole industrial method among the currently developed techniques for removal of phosphate ions, comprises addition of a chemical reagent containing ions of metals such as calcium and aluminum to waste water containing phosphate ions, thereby to remove the phosphate ions as hardly soluble phosphates. Nevertheless, this method, which produces large quantities of sludge with a fear of causing the secondary environmental pollution, is not necessarily regarded as the satisfactory one, and development of a novel technique for overcoming this defect is strongly demanded.

Hydrates of titanium oxide, zirconium oxide and tin oxide, on the other hand, possess the properties of ion exchangers and, for example in acidic solutions through the fixing of $H^+$, become the anion exchangers with the capacity for adsorbing oxyacid ions and halogen ions such as phosphate ion, sulfate ion, fluoride ion and chloride ion.

In addition, it has long been known that in an alkaline solution, they function as a cation exchanger through the fixing of $OH^-$.

Although these hydrates are known to be of utility as an ion exchanger, the fact is that the difficulties encountered in providing such hydrates with a sufficient degree of mechanical strength to permit the use as an ion exchanger has prevented them from coming into industrial use.

The present inventors, after extensive investigation carried out on an adsorbent based on the above-mentioned metal oxide hydrates with their attention to the anion exchange capacities of the above-mentioned metal oxide hydrates, especially their selective capacities to adsorb phosphate ion, have come to the findings that the adsorbent, which is produced by mixing one part by weight of each of the above-mentioned metal oxide hydrates or their mixture with about 1/10 to 3 parts by weight of a particular thermosetting resin and curing the resultant mixture, possesses such a degree of mechanical strength as may be industrially employable, and that it exhibits the excellent adsorption capacity for a wide variety of anions and cations, especially the improved selective adsorption capacity for phosphate ion, and, on the basis of such findings, have arrived at completing this invention.

According to one aspect of this invention, there is provided an adsorbent, which is produced by subjecting to curing a mixture consisting of (a) one part by weight of at least one member selected from the group consisting of titanium oxide hydrate, zirconium oxide hydrate and tin oxide hydrate and of (b) about 1/10 to 3 parts by weight of a thermosetting resin showing resistance to acids and alkalis such as an epoxy, unsaturated polyester or polyurethane resin.

The hydrate of titanium oxide, which is useful for production of the adsorbent according to this invention, is shown for example by the general formula, $TiO_2 \cdot nH_2O$ (wherein n is a positive number of 0.5 to 2.0), and specifically exemplified by $TiO_2 \cdot H_2O(TiO(OH)_2)$, $TiO_2 \cdot 2H_2O$ ($Ti(OH)_4$), or $TiO_2 \cdot nH_2O$ (n=1.5 to 2.0). The hydrate of zirconium oxide is shown by for example the general formula, $ZrO_2 \cdot nH_2O$ (wherein n is a positive number of 0.5 to 2.0), and specifically exemplified by $ZrO_2 \cdot H_2O$ ($ZrO(OH)_2$), $ZrO_2 \cdot 2H_2O$ ($Zr(OH)_4$) or $ZrO_2 \cdot nH_2O$ (n=1.5 to 2.0). Examples of the hydrate of tin oxide include the hydrates of the general formula, $SnO_2 \cdot nH_2O$ (wherein n is a positive number of 0.5 to 2.0), and specifically exemplified by $SnO_2 \cdot H_2O$ ($SnO(OH)_2$), $SnO_2 \cdot 2H_2O$ ($Sn(OH)_4$) or $SnO_2 \cdot nH_2O$ (n=1.5 to 2.0).

The above-mentioned metal oxide hydrates are respectively prepared, for example, the following conventional means.

A water-soluble salt of titanium, zirconium or tin, for example titanium tetrafluoride ($TiF_4$), titanium tetrachloride ($TiCl_4$), titanium sulfate ($Ti(SO_4)_2$), zirconium oxychloride ($ZrOCl_2 \cdot 8H_2O$), zirconium tetrachloride ($ZrCl_4$), zirconium sulfate ($Zr(SO_4)_2 \cdot 4H_2O$), zirconium acetate ($Zr(CH_3COO)_4$) and stannic chloride ($SnCl_4$) etc. is dissolved in water. The content of the salt is within the range of from about 0.1 to 5 mol %. To the aqueous solution, an alkaline aqueous solution ranging in concentration from about 5% to 20% by weight is added dropwise. White precipitates of titanium oxide hydrate, zirconium oxide hydrate or tin oxide hydrate are then formed. The alkaline aqueous solution is added until no additional precipitate is produced. The white precipitates are then collected by filtration, washed with water and dried at a temperature of not higher than 90° C.

The alkaline aqueous solution is exemplified by an aqueous solution of an alkali, for example, sodium hydroxide, potassium hydroxide, ammonium hydroxide, sodium carbonate, potassium carbonate etc.

The above-mentioned metal oxide hydrates may be used singly or as a mixture of two or more of them. Such metal oxide hydrate may take any form, though the ones with the particle size of about 40μ to about 250μ are particularly preferable in terms of the processability for mixing with resins, resulting adsorption performance, etc., as being hereinafter described.

According to this invention, one part by weight of a hydrate of titanium oxide, zirconium oxide or tin oxide or their mixture is mixed with about 1/10 to 3 parts by weight of, preferably about 1/5 to equal part by weight of, an epoxy, unsaturated polyester or polyurethane resin.

In cases where the amount of the resin is in excess of about 3 parts by weight as much as the metal oxide hydrate, mechanical strength of resultant adsorbent is enhanced, with reduction in its adsorption performance. Where proportion of the resin is reduced and under about 1/10 part by weight, the resultant adsorbent is excellent in adsorption performance but displays decreased mechanical strength, thus being unsuitable for industrial uses.

The epoxy resin, which is useful in the manufacture of the adsorbent according to this invention, is exemplified by diglycidyl ether produced by the reaction between 2,2'-bis(4-hydroxyphenyl)-propane and epichlorohydrin or methylepichlorohydrin, diglycidyl ether prepared by the reaction of glycols with epichlorohydrin or methylepichlorohydrin, polyglycidyl ether produced by the reaction of novolak from phenol and formaldehyde with epichlorohydrin or methylepichlorohydrin, epoxy resin derived from tetraglycidyl ether of tetraphenylene ethane and polybutadiene, and the like.

An unsaturated polyester resin means a solution formed by dissolving a linear unsaturated polyester obtained by subjecting a dicarboxylic acid having a double bond in the molecule such as maleic acid or its anhydride and fumaric acid etc. to condensation with a dihydric alcohol such as ethylene glycol and propylene glycol in a vinylic type monomer such as styrene, chlorostyrene, methyl methacrylate and diallyl phthalate etc. The above-mentioned dicarboxylic acid may be modified with an unsaturated or saturated dicarboxylic acid such as fumaric acid, itaconic acid, phthalic anhydride, adipic acid, hexachloroendomethylene tetrahydrophthalic acid (HET acid), sebacic acid, isophthalic acid, terephthalic acid, etc. Furthermore, the dihydric alcohol may also modified with glycol such as Bisphenol A, hydrogenated Bisphenol A, butane diol, diethylene glycol, dipropylene glycol, triethylene glycol, trimethylene glycol, hexane diol, pentane diol, etc.

A polyurethane resin is obtained by reacting a polyol having not less than two hydroxyl groups in the molecule such as polyether polyol, polyester polyol, polymer polyol, butadiene based polyol, polycarbonate diol, castor oil, etc., with an excess amount of a polyisocyanate having not less than two isocyanate groups in the molecule such as tolylene diisocyanate, diphenylmethane diisocyanate, naphthalene diisocyanate, dimethyl diphenyl diisocyanate, polymethylenepolyphenyl polyisocyanate, xylylene diisocyanate, hexamethylene diisocyanate, isophorone diisocyanate, etc. Such polyurethane resin ordinarily cures to a thermosetting resin due to heat or a crosslinking agent through the reaction among isocyanate groups contained in the resin or the reaction of such isocyanate groups with, e.g., ethylene glycol, propylene glycol, butane diol, glycerine, hexane triol, trimethylol propane, water, etc.

The epoxy, unsaturated polyester or polyurethane resin described hereinbefore, when they are liquid at room temperature, may be directly used but, when they are solid, should be converted into the liquid form by the use of an organic solvent, or a mixture, out of hydrocarbons such as butane, hexane, cyclohexane, benzene and toluene, halogenated hydrocarbons such as methylene chloride, chloroform, trichloroethane and chlorobenzene, alcohols such as methanol, ethanol and propanol, ketones such as acetone and methyl ethyl ketone, esters such as methyl acetate and ethyl acetate, ethers such as ethyl ether and dioxane, etc., or by means of heating at a temperature of not higher than 90° C.

As the specific procedure for mixing a metal oxide hydrate with a resin, is shown by for example a mixing by stirring at a high speed the metal oxide hydrate and resin in a container equipped with a stirrer, a batch-wise or continuous mixing by means of a kneader and a batch-wise or continuous mixing by the use of an apparatus used for the solid-liquid mixing.

In mixing a metal oxide hydrate with a resin, to an epoxy resin may be added in an appropriate amount, if necessary, amine based crosslinking agents such as diethylene triamine, triethylene tetramine and meta-phenylene diamine etc. or crosslinking agents such as phthalic anhydride, maleic anhydride and methylendomethylene tetrahydrophthalic acid(methylnadic anhydride), etc. To an unsaturated polyester resin may be added in a suitable amount, meanwhile, catalysts such as benzoyl peroxide, lauroyl peroxide, acetyl peroxide, methyl ethyl ketone peroxide, and t-butyl peroxide isobutylate, and curing accelerators such as cobalt naphthenate, manganese naphthenate, dimethylaniline, phenylmorpholine, diethanolaniline, vanadyl acetylacetonate and phenylphosphinic acid etc.

After the metal oxide hydrate and resin are mixed, curing is carried out. The curing, which is normally conducted at room temperature, may be carried out by heating at a temperature of about 30° to 90° C., in cases where the curing time is prolonged. A cured matter may be crushed by a hammer mill, roll crusher, etc. and then sieved to the uniform particle size, whereby such particle size is preferably in the range of about 3 to 60 mesh. Alternatively, a resulting mixture, for example, may be continuously extruded in the cylindrical form on a steel belt conveyor or similar device, and held on the steel belt conveyor for the period of time enough to allow the mixture to cure, followed by cutting the cured, cylindrical-formed adsorbent to the appropriate length.

Further, in a saucer type rotating granulator or a centrifugal, fluid coating granulator, the metal oxide hydrate and resin may be simultaneously fed to such machine with small particles of the mixture placed as nuclei and granulated under coating to produce spherical-formed adsorbents.

The adsorbent according to this invention obtained in this manner can be used as an adsorbent for a great variety of anions such as phosphate ion, fluoride ion, chloride ion, nitrate ion, sulfate ion, chromate ion and arsenite ion or the like in various acidic solutions or cations such as lithium ion, sodium ion, potassium ion, rubidium ion, cesium ion or the like, in various alkaline solutions and especially as the adsorbent for phosphate ion, because it adsorbs selectively phosphate ion in an acidic solution of the pH range of about 1.5 to 5.

As a reagent, which is useful for adjusting the pH of a solution containing phosphate ions, when the solutions are alkaline, is shown by for example an inorganic acid such as sulfuric acid, hydrochloric acid, nitric acid etc. but, when the solution is acidic, an alkali such as sodium hydroxide, potassium hydroxide, ammonium hydroxide, sodium carbonate, potassium carbonate etc. is used.

The content of phosphate ions in the solution is not specifically limited and is preferably within the range of about 0.1 to 10,000 ppm.

As the specific procedure for allowing an adsorbent to come into contact with a solution containing phosphate ions, is shown by for example (a) fixed bed adsorption process, (b) moving bed adsorption process, (c) fluidized-bed adsorption process, (d) addition process of an adsorbent to a solution containing phosphate ions etc.

The contact of an adsorbent with a solution containing phosphate ions can be carried out either in a batch-wise or continuous operation.

In cases where the contact is carried out according to the process (a), a solution containing phosphate ions is fed into a column packed with an adsorbent from the top or bottom of the column. Two or more columns may be provided. In at least one column, the contacting is carried at all times while in others, an adsorbent is regenerated or replaced.

In cases where the contact is conducted according to the process (b), a solution containing phosphate ions is fed from the bottom of the column packed with an adsorbent in the counter-current manner against the adsorbent. The treated solution is discharged from the top of the column.

In cases where the contact is carried out according to the process (c), a solution containing phosphate ions is fed into a column packed with an adsorbent from the bottom so as to form a fluidized bed of the adsorbent. The treated solution is discharged from the top of the column.

In cases where the contact is carried out according to the process (d), an adsorbent is added to a solution containing phosphate ions placed in a tank. With stirring, the phosphate ions are efficiently adsorbed.

The solution is separated from the adsorbent by means conventional per se, such as filtration, sedimentation and centrifugal separation etc.

The adsorbent having adsorbed anions or cations is treated with a solution of an alkali or acid, respectively, to liberate the anion or cation into the solution.

More concretely, the adsorbent having adsorbed phosphate ions liberates the phosphate ions into the aqueous solution by treating with an aqueous solution of an alkali.

The alkali is exemplified by sodium hydroxide, potassium hydroxide, ammonium hydroxide and sodium carbonate etc and preferably sodium hydroxide. The pH of the aqueous solution of the alkali is within the range of not less than about 8, and preferably not less than about 10.

The content of the alkali in the aqueous solution is within the range of about 1 to 30 weight %.

In cases where sodium hydroxide is used as an alkali, the adsorbent having adsorbed phosphate ions liberates the phosphate ions in the form of sodium phosphate, whereby regeneration of the adsorbent and recovery of an aqueous solution containing sodium phosphate can be conducted at the same time. The concentration of sodium phosphate in the aqueous solution thus recovered is generally very low and is within the range of about 1.5 to 12% by weight. For taking out of the solution sodium phosphate in the form of crystals, is most generally employed a procedure of separating it by concentrating the solution to a concentration of oversaturation of sodium phosphate to allow crystals to precipitate.

In the current age when a remarkable energy-saving is required, however, the concentration process that consumes vast amounts of fuel is not favored from the standpoint of cost reduction as well.

In view of these circumstances, the present inventors conducted comprehensive research on the process for recovering crystals of sodium phosphate from a solution containing sodium phosphate at reduced costs without resorting to a procedure such as concentration and by way of simplified procedure, thus leading to the finding that addition to said solution of sodium hydroxide or its concentrated solution allows the sodium phosphate to precipitate efficiently in the form of crystals.

A suitable form of sodium hydroxide to be added to a solution containing sodium phosphate includes a solid form, such as flake and pellet forms, or in a concentrated solution form with the concentration of, for example, not less than 20% by weight.

As regards the quantity to be added, the explanation is below given based on FIG. 1. FIG. 1 indicates the amount of sodium phosphate dissolving in an aqueous solution of sodium hydroxide at 25° C. As is obvious from the drawing, the amount of sodium phosphate dissolving in an aqueous solution of sodium hydroxide varies with the concentration of sodium hydroxide present in the aqueous solution; that is to say, about 12.4% by weight of sodium phosphate dissolves in water being entirely free of sodium hydroxide, whereas sodium phosphate, merely in the amount of 0.4% by weight, is soluble in an aqueous solution containing 15% by weight of sodium hydroxide (point A). For example, the point B in the drawing indicates a diluted solution of sodium phosphate with a sodium phosphate content of 5% by weight and containing 4% by weight of sodium hydroxide; in this case, with the view of taking out sodium phosphate in the form of crystals, sodium hydroxide either in the solid form or a concentrated solution is added until the saturation state (point C) of about 6.4% by weight in sodium hydroxide concentration is reached; when sodium hydroxide is further added up to its concentration as high as about 15% by weight (point D), the content of dissolved sodium phosphate at this sodium hydroxide concentration is about 0.4% by weight, and, assuming that the diluted solution of sodium phosphate weighs 100 g, sodium phosphate will precipitate in the amount of 4.6 g which corresponds to $100 \text{ g} \times ((5/100) - (0.4/100))$.

The above-mentioned procedure of allowing crystals of sodium phosphate to precipitate is conducted at 25° C., and such procedure is normally conducted at a temperature within the range of about 10° to 30° C. Even in cases where temperature and concentrated of sodium phosphate in a solution for allowing crystals of sodium phosphate to precipitate are different from those described above, the procedure is substantially the same as described above.

Sodium phosphate thus precipitated can be separated easily by means conventional per se, such as filtration and centrifugal separation etc.

The crystals of sodium phosphate obtained in this manner are of a high purity. Moreover, the mother liquor resulting from separation of crystals of sodium phosphate, not only exhibiting a very small content of sodium phosphate but also containing normally about 5 to 20% by weight of sodium hydroxide, can be repeatedly utilized, for example, in the procedure of regenerating with sodium hydroxide adsorbents having adsorbed phosphate ions.

According to the procedure described above, expense for concentration, which is required for the conventional evaporation concentration process is avoided, and sodium phosphate can be recovered in the crystalline form at reduced cost. Furthermore, recovery from an extremely diluted solution of sodium phosphate is also be possible.

The adsorbent according to this invention shows its excellent mechanical strength.

The adsorbent displays also improved chemical resistance, resistant to acids and alkalis, and can be subjected to repeated desorption and regeneration procedures without causing any deterioration of its adsorptive capacity, thus permitting the repeated usage over a long periof of time.

For a further detailed explanation of this invention, the following Examples are given, wherein the term "%" means "% by weight" and the term "SV" means "space velocity."

EXAMPLE 1

Prepared was 100 cc of a 1 mol aqueous solution of zirconium oxychloride. The solution contained metal ions of 9.1 g as Zr. As a 6 N aqueous ammonia was added dropwise to the aqueous solution, there resulted white precipitates of zirconium hydroxide. The 6 N aqueous ammonia was added until no additional precipitate was produced. At this time, the solution showed pH of 6.0. The white precipitates were then filtered off by suction, washed three times with deionized water, and dried at a temperature of not higher than 50° C. The yield was 16.0 g. The reaction product was pulverized in a mortar to a particle size of below 120μ to prepare the powder of zirconium oxide hydrate ($ZrO_2.2H_2O$). 16 g of powdered zirconium oxide hydrate was weighed in a beaker, and 16 g of an isophthalic-acid-maleic acid-propylene glycol based unsaturated polyester resin was added, followed by stirring and mixing sufficiently with a stirring pestle. Thereafter, 0.08 g of cobalt naphthenate and 0.16 g of methyl ethyl ketone peroxide were added and mixed adequately to achieve curing. The curing time was about 30 to 60 minutes. The resultant solidified resin was then taken out of a beaker, crushed to a suitable size and sieved to a particle size of 8 to 32 mesh to produce the adsorbent.

EXAMPLE 2

Prepared in the same manner as in Example 1 was 16 g of the powder of zirconium oxide hydrate, to which added were 4 g of the same isophthalic acid-maleic acid-propylene glycol based unsaturated polyester resin as used in Example 1, 0.02 g of cobalt naphthenate and 0.04 g of methyl ethyl ketone peroxide. The mixture was adequately stirred and mixed, and, upon standing, cured to a solidified matter in about 60 minutes. The solidified resin was crushed to a suitable size and sieved to a particle size of 8 to 32 mesh to prepare the adsorbent.

EXAMPLE 3

Weighed out was 16 g of a commercially available powder of titanium oxide hydrate ($TiO_2.2H_2O$), and there was obtained, in the same manner as in Example 1, the adsorbent solidified with an isophthalic acid-maleic acid-propylene glycol based unsaturated polyester resin.

EXAMPLE 4

Prepared was an equivoluminal solution consisting of 100 cc each of a 1 mol aqueous solution of titanium oxide hydrate and a 1 mol aqueous solution of zirconium oxychloride. The solution contained metal ions of 4.8 g as Ti and 9.1 g as Zr. A 3 N NaOH solution was added dropwise to the mixed aqueous solution to adjust to pH 7. In the solution, there were considered to be contained coprecipitations of titanium oxide hydrate and zirconium oxide hydrate. The precipitates were then washed, filtered off, and dried at a temperature of not higher than 50° C. to be pulverized finely to a particle size of not more than 120 mesh (yield of about 26 g).

16 g of the pulverized produce was then weighed out and, in the same manner as in Example 1, there was obtained the adsorbent solidified with an isophthalic acid-maleic acid-propylene glycol based unsaturated polyester resin.

EXAMPLE 5

In the same manner as in Example 1 was obtained 16 g of the powder of zirconium oxide hydrate, to which 7 g of a bisphenol-A-propylene oxide-fumaric acid based unsaturated polyester resin was added to be stirred and mixed adequately. Then, 0.035 g of 1% cobalt naphthenate, 0.07 g of methyl ethyl ketone peroxide and further 0.007 g of dimethylaniline were added and mixed adequately under an $N_2$ stream to allow the mixture to cure. The curing time was 35 to 45 minutes. The solidified product was crushed and sieved to obtain the adsorbent of 8 to 32 mesh in particle size.

EXAMPLE 6

By the same procedure as in Example 1 was obtained 16 g of the powder of zirconium oxide hydrate. While the powder was suspended in 10 ml of water, 10 ml of a hydrophilic urethane prepolymer was added dropwise with stirring for mixing, the prepolymer being prepared by reaction of a hydrophilic polyether polyol with an excess of tolylene diisocyanate, the hydrophilic polyether polyol being prepared by copolymerization of ethylene oxide and propylene oxide in the presence of glycerine as an initiator. The reaction between the hydrophilic polyurethane prepolymer and water was instantaneously initiated, and there was formed a foamed gel under evolution of a carbon dioxide gas. There was the powder of zirconium oxide hydrate dispersed and held in the gel. The gel was cut to a suitable size to produce the adsorbent.

EXAMPLE 7

The adsorbent test-prepared in Example 2 was pulverized to obtain the product of through 120-mesh sieve. The powder of the adsorbent as described above was added in such an amount as being shown in the following Table to 100 ml of an aqueous solution (pH=3) containing 500 ppm of phosphate ions prepared by the use of sodium hydrogenphosphate. After shaking for one day (24 hours), concentration of phosphate ions in the aqueous solution was measured to determine the adsorbed amount of phosphate ions by the adsorbent, with the results tabulated in Table 1.

In Table 1 is also included the adsorbed amount by active alumina powder which has been conventionally known as an adsorbent for phosphate ions.

TABLE 1

| Experiment number | Adsorbent Example 2 | Added amount of adsorbent (g) | $PO_4^{-3}$ concn. Before adsorption | (mg/l) After adsorption | Adsorbed amount of $PO_4^{-3}$ (mg/g) |
|---|---|---|---|---|---|
| 1 | Adsorbent of this invention | 0.20 | 500 | 210 | 145 |
| 2 | Adsorbent of this invention | 0.30 | 500 | 110 | 130 |
| 3 | Adsorbent of this invention | 0.40 | 500 | 20 | 120 |
| 4 | Commercially | 0.80 | 500 | 50 | 56 |

TABLE 1-continued

| Experiment number | Adsorbent Example 2 | Added amount of adsorbent (g) | $PO_4^{-3}$ concn. (mg/l) Before adsorption | After adsorption | Adsorbed amount of $PO_4^{-3}$ (mg/g) |
|---|---|---|---|---|---|
| | available active alumina | | | | |

EXAMPLE 8

Into a column of 16 mm in inner diameter was packed with 20 ml (about 20 g) of the adsorbent (8 to 32 mesh) prepared in Example 2, which was conditioned by the use of sodium hydrogenphosphate. An aqueous solution (adjusted with dilute sulfuric acid to pH=3) containing 200 ppm of phosphate ions was passed through the column at a flow rate of SV=2 l/hr, and samples were taken at regular intervals of time from an effluent solution from the column to measure the concentrations of phosphate ions. The results are shown in Table 2.

TABLE 2

| Volume of aqueous solution passed (l) | Volume of the column passed by aqueous solution, (times) | Concn. of $PO_4^{-3}$ in effluent solution, (ppm) |
|---|---|---|
| 0 | — | — |
| 1 | 50 | 2 |
| 2 | 100 | 7 |
| 3 | 150 | 13 |
| 4 | 200 | 18 |
| 5 | 250 | 33 |

The adsorbed amount of phosphate ions by the adsorbent after 5 l of the aqueous solution had been passed was about 47 mg $PO_4^{---}$ per g of adsorbent. When 40 cc of a 15% NaOH solution was passed through it at a rate of SV=2 l/hr, it was found out that about 93% of the phosphate ions adsorbed were eliminated. The adsorbent was desorbed and regenerated to pass 5 l of the aqueous solution under the same conditions. The adsorbent, after being used repeatedly for 80 times in this way, was found to display no decrease in the adsorption capacity.

EXAMPLE 9

Prepared was 100 cc of a 2 mol aqueous solution of stannic chloride. The solution contained metal ions of 23.7 g as Sn. Dropwise addition of a 15% NaOH solution to the aqueous solution gave white precipitates of stannic hydoxide. The 15% aqueous solution of sodium hydroxide was added until no additional precipitate was produced. At this time, the solution showed pH of about 7. The white precipitates were then filtered off by suction, washed with deionized water until no chloride ion was observed, and dried at a temperature of not higher than 50° C. The yield was about 37 g. The reaction product was pulverized in a mortar to a particle size of smaller than 120μ to prepare the powder of tin oxide hydrate ($SnO_2.2H_2O$). 20 g of powdered tin oxide hydrate was weighed in a beaker, and 5 g of the time isophthalic acid-maleic acid-propylene glycol based unsaturated polyester resin as used in Example 1, 0.05 g of cobalt naphthenate and 0.10 g of methyl ethyl ketone peroxide were added and mixed adequately to achieve curing. The curing time was 20 minutes. The resultant solidified matter was then taken out of the beaker, crushed to a suitable size and sieved to a particle size of 32 to 60 mesh to produce the adsorbent.

EXAMPLE 10

Prepared in the same manner as in Example 1 is 15 g of the powder of zirconium oxide hydrate, to which added were 5 g of a liquid epoxy resin (a reaction product of 2,2'-bis(4-hydroxyphenyl)propane with epichlorohydrine) and 0.1 g of diethylenetriamine as a crosslinking agent. The mixture was adequately stirred and mixed, and, upon heating at 80° C., cured to a solidified matter in about 60 minutes. The solidified matter was crushed to a suitable size and sieved to a particle size of 32 to 60 mesh to prepare the adsorbent.

EXAMPLE 11

A commercially available adsorbent of zirconium oxide hydrate ($ZrO_2.2H_2O$) was pulverized to obtain the product of through 120-mesh sieve.

40 kg of the adsorbent was weighed in a batch mixer, and 1.3 kg of the same isophthalic acid-maleic acid-propylene glycol based unsaturated polyester resin as used in Example 1, 10 g of cobalt naphthenate and 20 g of methyl ethyl ketone peroxide were added and mixed adequately. The mixture was then taken out of the mixer. The mixture was heated at 50° C., and it cured to a solidified matter in about 20 minutes. The solidified matter was crushed to a suitable size and sieved to a particle size of 16 to 60 mesh to prepare the adsorbent.

EXAMPLE 12

Into a column of 10 mm in inner diameter was packed with 15 g (20 ml) of an adsorbent obtained in Example 1, and an aqueous solution containing phosphate ions prepared by dissolving sodium dihydrogen phosphate in water and adjusting to the $PO_4^{---}$ concentration of 400 ppm was passed through the adsorbent at a flow rate of SV=3 l/hr until it was broken through (the breaking through point: 40 ppm). The adsorbent was found to adsorb $PO_4^{---}$ of 62 mg per g of the adsorbent up to the breaking-through. 30 ml of a 15% aqueous solution of sodium hydroxide was made to flow through the used adsorbent at a flow rate of SV=1 l/hr, followed by washing away with 30 ml of water, thereby yielding about 60 ml of the effluent. The effluent exhibited a sodium phosphate concentration of about 2.6% by weight, along with a sodium hydroxide concentration of about 7.1%. The effluent, as it stands in this stage, may be regarded to represent the dissolution of sodium phosphate in the aqueous solution of sodium hydroxide (cf FIG. 1).

Then, about 5 g of sodium hydroxide as a dry solid was charged for dissolution in the aqueous solution of sodium hydroxide containing sodium phosphate, which, upon cooling down to room temperature, separated out crystals of sodium phosphate. The crystals were collected by filtration and found to weigh 3.2 g. On the other hand, the concentration of sodium hydroxide in the resulting mother liquor was about 16%. And, the recovery rate of $PO_4^{---}$ was about 86%.

EXAMPLE 13

Using the same adsorbent, column and aqueous solution containing phosphate ions as in Example 12, there was obtained the adsorbent having adsorbed 64 mg of phosphate ions per g of the adsorbent.

The mother liquor recovered in Example 12 was of about 16% in concentration of sodium hydroxide and of about 1000 ppm in content of phosphate ions. The solution was repeatedly used to recover crystals of sodium phosphate.

In the next place, phosphate ions were desorbed with the use of the above-mentioned, recovered solution of sodium hydroxide by the same procedure as in Example 12, resulting in about 60 ml of the effluent. The effluent showed the sodium phosphate concentration of about 2.7% and the sodium hydroxide concentration of about 7.5%.

Then, crystals of sodium phosphate were allowed to precipitate by the same procedure as in Example 12, and the crystals were recovered by filtration to give the yield of 3.6 g.

The recovery rate of $PO_4^{---}$ was about 94%.

EXAMPLE 14

Into a column of 200 mm in inner diameter to a packing height of 1.6 m was packed about 50 kg (50 l) of an adsorbent obtained in Example 11, and activated-sludge treated water containing about 30 ppm of $PO_4^{---}$ was passed through the column at a flow rate of $SV=3$ l/hr until the breaking through (the breaking through point of 3 ppm). The adsorbent was found to adsorb $PO_4^{---}$ of 45 g per 1 kg of the adsorbent up to the breaking through.

Then, 75 l of a 15% aqueous solution of sodium hydroxide was made to flow through the adsorbent at a flow rate of $SV=1.3$ l/hr, followed by washing away with 60 l of water, to thereby yield 135 l of the effluent. The effluent showed a sodium phosphate concentration of about 2.9%, along with a sodium hydroxide concentration of about 7.9%.

Following this, 10 kg of flake-formed sodium hydroxide was charged for dissolution into the effluent, which was allowed to stand for two days to permit precipitation of crystals of sodium phosphate. The crystals were recovered by filtration to give the yield of 7.94 kg. On the other hand, the concentration of sodium hydroxide in the resulting mother liquor was 15.4%. And, the recovery rate of $PO_4^{---}$ was 88%.

What is claimed is:

1. An adsorbent, which is prepared by subjecting to curing a mixture consisting of (a) one part by weight of at least one member selected from the group consisting of metal oxide hydrate represented by the general formula:

$$MO_2 \cdot nH_2O$$

wherein M is titanium, zirconium or tin and n is a positive number of 0.5 to 2.0 and (b) about 1/10 to 3 parts by weight of unsaturated polyester resin in a vinyl showing resistance to acids and alkalis.

2. An adsorbent as claimed in claim 1, wherein the weight part of the resin is within the range of about 1/5 to 1 part by weight.

3. An adsorbent as claimed in claim 1, wherein the metal oxide hydrate is zirconium oxide hydrate.

4. A process for preparing an adsorbent, which comprises curing a mixture consisting of (a) one part by weight of at least one member selected from the group consisting of metal oxide hydrate represented by the general formula:

$$MO_2 \cdot nH_2O$$

wherein
M is titanium, zirconium or tin and
n is a positive number of 0.5 to 2.0
and (b) about 1/10 to 3 parts by weight of unsaturated polyester resin in a vinyl monomer showing resistance to acids and alkalis.

5. A process for removing anions or cations from an acidic or alkaline solution containing anions or cations, which comprises the step of allowing an adsorbent to contact an acidic or alkaline solution containing anions or cations, the adsorbent being prepared by subjecting to curing a mixture consisting of (a) one part by weight of at least one member selected from the group consisting of metal oxide hydrate represented by the general formula:

$$MO_2 \cdot nH_2O$$

wherein
M is titanium, zirconium or tin and
n is a positive number of 0.5 to 2.0
and (b) about 1/10 to 3 parts by weight of unsaturated polyester resin in a vinyl monomer showing resistance to acids and alkalis.

6. A process as claimed in claim 5, wherein the anion is phosphate ion.

7. A process as claimed in claim 6, wherein the adsorbent is one obtained by regenerating an adsorbent having adsorbed phosphate ion with an aqueous solution of sodium hydroxide.

8. A process as claimed in claim 7, which comprises a further step of recovering the resulting aqueous solution containing sodium phosphate.

9. A process as claimed in claim 8, which comprises a further step of adding sodium hydroxide to the recovered aqueous solution containing sodium phosphate to allow the sodium phosphate to precipitate in the form of crystals and separating the precipitated sodium phosphate.

10. A process as claimed in claim 7, wherein the aqueous solution of sodium hydroxide is a mother liquor left by the separation of crystals of sodium phosphate from the recovered aqueous solution containing sodium phosphate by adding thereto sodium hydroxide.

* * * * *